United States Patent [19]
Schwarz et al.

[11] Patent Number: 5,673,980
[45] Date of Patent: Oct. 7, 1997

[54] SOLENOID VALVE WITH PRESSURE LIMITATION FOR CONTROLLED-SLIP MOTOR VEHICLE BRAKE SYSTEMS

[75] Inventors: Hans-Friedrich Schwarz, Muehlacker; Norbert Mittwollen, Markgroeningen, both of Germany

[73] Assignee: Robert Bosch GmbH, Stuttgart, Germany

[21] Appl. No.: 597,824

[22] Filed: Feb. 7, 1996

[30] Foreign Application Priority Data

Feb. 8, 1995 [DE] Germany .................. 195 04 077.5

[51] Int. Cl.⁶ ...................................................... B60T 8/36
[52] U.S. Cl. .................... 303/119.2; 137/599.2; 251/129.02; 251/117
[58] Field of Search ............... 303/119.1, 119.2; 137/599.2; 251/129.02, 117

[56] References Cited

U.S. PATENT DOCUMENTS

| | | | |
|---|---|---|---|
| 4,915,131 | 4/1990 | Cha | 137/599.2 X |
| 5,167,442 | 12/1992 | Alaze et al. | 303/113.2 |
| 5,356,211 | 10/1994 | Fritsch | 303/119.2 |
| 5,375,623 | 12/1994 | Weber | 137/599.2 X |
| 5,496,100 | 3/1996 | Schmid | 303/119.2 |

FOREIGN PATENT DOCUMENTS 4234749  4/1994  Germany .

*Primary Examiner*—Lee W. Young
*Attorney, Agent, or Firm*—Edwin E. Greigg; Ronald E. Greigg

[57] ABSTRACT

A solenoid valve having a first seat valve for performing a closing function and a second seat valve, connected in parallel thereto, for a pressure-limiting function. A pressure medium spilled by the second seat valve flows off through a flow-off bore acting as a throttle. Pressure surges are thus largely avoided in the part of the brake system located on the flow-off side. The solenoid valve can be used in controlled-slip hydraulic brake system of motor vehicles.

11 Claims, 3 Drawing Sheets

SOLENOID VALVE WITH PRESSURE LIMITATION FOR CONTROLLED-SLIP MOTOR VEHICLE BRAKE SYSTEMS

PRIOR ART

The invention relates to a solenoid valve as set forth hereinafter.

Such a solenoid valve is already known (DE 4,234,749 A1). According to DE 4,041,506 A1, the solenoid valve is arranged in a brake line between a brake master cylinder and a pressure control valve arrangement for slip control on a wheel brake of the vehicle. Connected to the brake line between the solenoid valve and the pressure-control valve arrangement is the outlet of a high-pressure pump, by means of which a pressure medium can be fed into the brake line in the event of slip control. When drive slip control occurs, the solenoid valve assumes its closed position, in which the closing member of the seat valve is under the effect of the pretensioned compression spring in the valve tappet, that is to say both the closing function and the pressure-limiting function of the solenoid valve are activated. When the pump pressure exceeds the opening pressure of the solenoid valve, the seat valve of the latter assumes a partly open position counter to the force of the compression spring, so that a pressure medium can flow off to the brake master cylinder. Because the pump conveys in a pulsating manner, pressure surges occur in the brake line part located on the flow-off side, said pressure surges causes disturbing noises in the interior of the motor vehicle. Particularly disturbing, however, is the pressure surge which occurs when the solenoid valve changes over into the open position as a result of the sudden flow-off to the brake master cylinder of the pressure medium stored elastically in that part of the brake system located on the wheel-brake cylinder side.

Advantages of the invention

In contrast to this, the advantage of the solenoid valve according to the invention is that a separation of the functions is carried out, in that the closing function is performed by the first seat valve and the pressure-limiting function by the second seat valve, pressure medium spilled by the latter being subjected to a throttling of the volume flow supplied in a pulsating manner, so that said volume flow is equalized and pressure surges in the brake line part located on the brake master cylinder side are avoided at a low outlay on the solenoid valve.

Advantageous developments and improvements of the solenoid valve specified hereinafter are possible as a result of the measures listed hereinafter.

By means of the measures specified herein, the noise behavior of the brake system is considerably improved in terms of the minimizing of the noise, even when the solenoid valve changes over into the open position, since, during the transition of the seat valve from the closed position into the partly open position, the shaping of the valve seat and closing member of the first seat valve and the associated part of the valve tappet causes a flow of a pressure medium into the gap space, said flow giving rise there to a dynamic pressure which is transmitted by the connecting bore and the pressure-medium duct into the control chamber and which exerts a force on the magnet armature, said force counteracting the hydraulic opening force and thus greatly slowing the operation of the opening of the first seat valve into the open position. The volume flow of the pressure medium can thereby increase through the first seat valve in only a throttled manner, so that, at most, a highly attenuated pressure surge takes effect in the brake line part located on the flow-off side.

Expedient designs for the region of the first seat valve are disclosed. These designs can be produced at a low outlay in manufacturing terms.

By means of the measure specified, a reliable transmission of the pressure into the control chamber is achieved, at the same time with a separation of the magnet armature and valve tappet which is favorable in manufacturing and assembly terms. Slants as a consequence of manufacture between the magnet armature and the valve tappet can be tolerated, since they do not impair the tightness of the pressure-medium channel.

The development of the invention set forth is advantageous, because a pressure separation of the control chamber from the tappet-side valve dome interior is thereby provided in a simple way.

BRIEF DESCRIPTION OF THE DRAWINGS

Exemplary embodiments of the invention are represented in simplified form in the drawing and are explained in more detail in the following description.

DETAILED DESCRIPTION OF THE EXEMPLARY EMBODIMENTS

Figure 1:
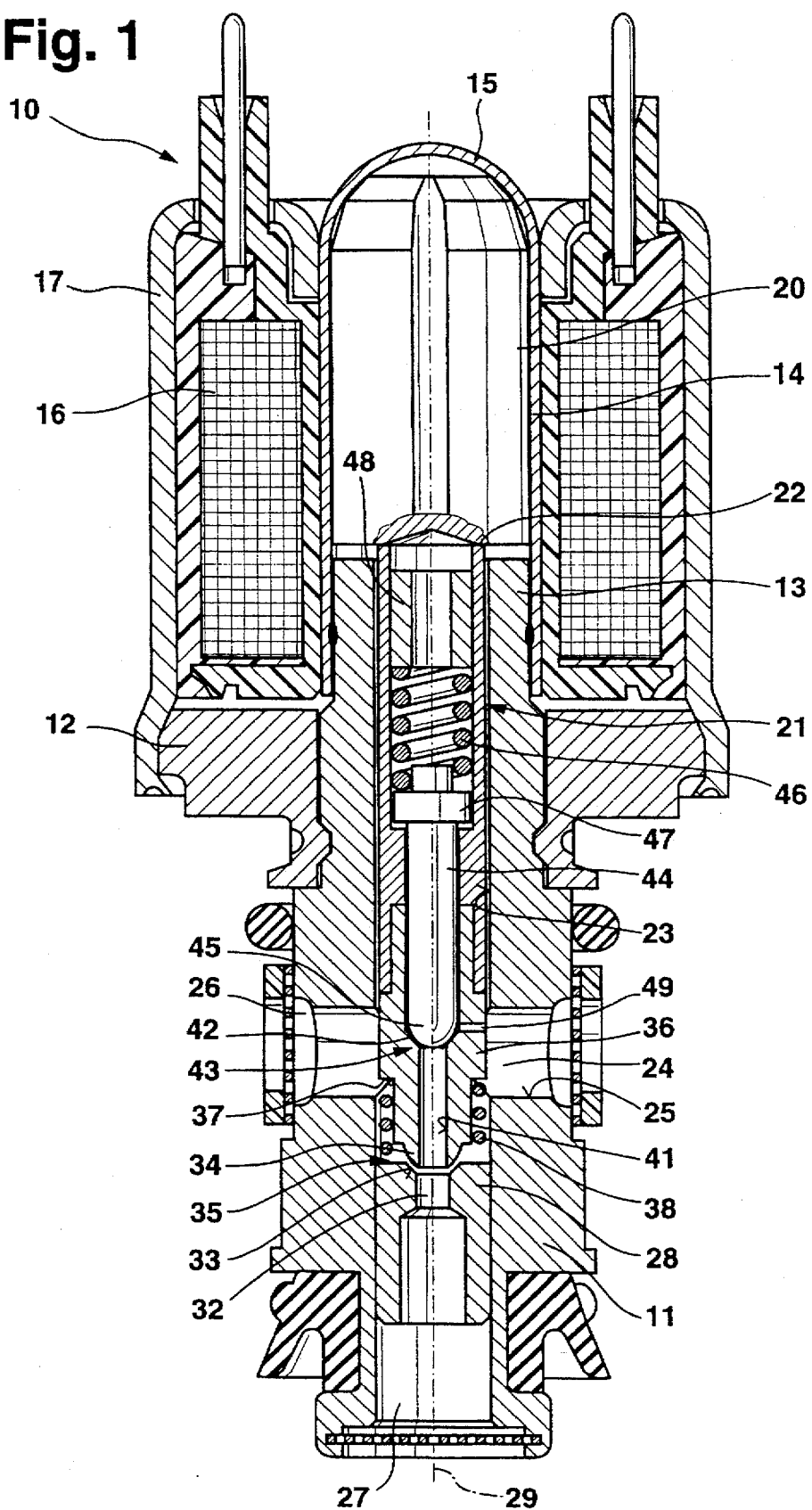
FIG. 1 shows a longitudinal section through a solenoid valve as a first exemplary embodiment, with a first seat valve serving for the closing function and with a second seat valve performing a pressure-limiting function and having a throttle point located on the flow-off side.

The solenoid valve 10 with pressure limitation, represented as a first exemplary embodiment in FIG. 1, is provided for use in controlled-slip hydraulic brake systems of motor vehicles. The solenoid valve 10 has a valve housing 11 which is intended to be received in a valve block (not shown) and is connected to a yoke disk 12. The valve housing 11 is continued beyond the yoke disk 12 by means of a pole core 13. Slipped onto the pole core 13 is a closed tubular valve dome 14. The latter is sealingly connected by welding to the pole core 13. Facing away from the pole core, the valve dome 14 is closed off by means of a hemispherical cap 15. The valve dome 14 is surrounded by an annular magnet coil 16. A bell-shaped housing 17 of the magnet coil 16 on the one hand engages on the valve dome 14 and on the other hand is connected to the yoke disk 12.

Received so as to be longitudinally movable in the valve dome 14 closed on the coil side is an essentially circular-cylindrical magnet armature 20. A valve tappet 21 is supported on the magnet armature 20. The magnet armature 20 and the valve tappet 21 are separate components which engage on one another with a sealing fit 22. The valve tappet 21 extends so as to be longitudinally movable in a continuous longitudinal bore 23 of the valve housing 11 and of the pole core 13. The longitudinal bore 23 is intersected, to form a valve chamber 24, by a transverse bore 25. The latter forms a connection 26 which, according to DE 4,041,506 A1 mentioned initially, is connected to a brake master cylinder of the brake system (not shown). In contrast, a second connection 27 at that end of the longitudinal bore 23 facing away from the armature is connected to at least one wheel-brake cylinder on the delivery side of a high-pressure pump. A pressed-in valve body 28 is located in the longitudinal bore 23 of the valve housing 11, between the transverse bore 25 and the connection 27. The valve body 28, the valve tappet 21 and magnet armature 20 are arranged in the longitudinal axis 29 of the solenoid valve 10.

The valve body 28 having a longitudinal passage bore possesses a valve seat 33 in the form of a hollow cone, said valve seat 33 facing the valve chamber 24 and enclosing a valve orifice 32. The valve seat 33 is assigned a spherically designed closing member 34 of the valve tappet 21. The closing member 34 and the valve seat 33 form a first seat valve 35 of the solenoid valve 10. By means of this seat valve 35, the passage of the solenoid valve 10 can be switched between the connections 26 and 27. The closing member 34 is formed at the free end of a sleeve-shaped tappet element 36 extending coaxially to the valve tappet 21 and pressed into the latter. The tappet element 36 has a supporting surface 37, on which a return spring 38 engaging on the valve body 28 is supported. When the magnet coil 16 is not energized, said return spring 38 keeps the first seat valve 35 in its open position.

Starting from the closing member 34 of the first seat valve 35, there passes through the tappet element 36 of the valve tappet 21 a longitudinal bore 41 which extends coaxially with the longitudinal axis 29 and which is connected to the valve orifice 32 of the first seat valve and opens into a hollow-conical valve seat 42 of a second seat valve 43. Received in the valve tappet 21 is a closing-member carrier 44 which is guided so as to be longitudinally movable and which has at one end the spherical closing member 45 of the second seat valve 43. At its other end, the closing-member carrier 44 is loaded by a pretensioned compression spring 46 arranged in the hollow valve tappet 21. Said compression spring 46 on the one hand engages on a collar 47 of the closing-member carrier 44 and on the other hand is supported on a sleeve 48 pressed into the valve tappet 21. Under the effect of the compression spring 46, the second seat valve 43 assumes its closed position, in which the closing member 45 engages on the valve seat 42.

Figure 2:
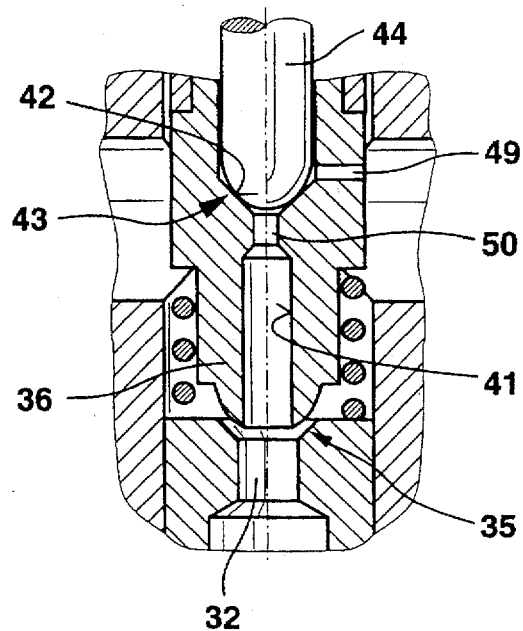
FIG. 2 shows an enlarged detail of an alternative version of the exemplary embodiment according to FIG. 1, with a throttle point located on the inflow side and flow-off side in the region of the second seat valve.

A radially extending flow-off bore 49 of small diameter commences on the side of the valve seat 42 facing away from the longitudinal bore 41 of the tappet element 46. When the second seat valve 43 assumes its open position, said flow-off bore 49 makes a connection conducting pressure medium from the connection 27 through the valve orifice 32 of the valve body 28 and the longitudinal bore 41 of the tappet element 36 into the valve chamber 24 to the connection 26 of the solenoid valve 10. At the same time, the flow-off bore 49, as a result of its small cross-section, acts as a throttle point for the pressure medium, said throttle point being located on the flow-off side in relation to the second seat valve 43. In the version of the exemplary embodiment according to FIG. 1 which is represented in FIG. 2, a second throttle point is also provided on the inflow side of the second seat valve 43. Said second throttle point consists of a connecting bore 50 of small diameter between the longitudinal bore 41 of the tappet element 36 and the valve seat 42 of the second seat valve 43.

The solenoid valve 10 has the following mode of operation:

During braking without slip control, when there is a pressure buildup in the wheel-brake cylinder (see DE 4,041,506 A1, FIG. 1), the pressure medium flows through the first seat valve 35, assuming its open position, from the connection 26 to the connection 27, and when there is a pressure reduction said pressure medium flows through it in the opposite direction.

During braking for the control of drive slip, when current flows through the magnet coil 16 a magnetic field is generated, which magnetic field exerts a force on the magnet armature 20 and displaces the latter in the direction of the valve body 28. The valve tappet 21 supported on the magnet armature 20 is also moved counter to the force of the return spring 38 and the first seat valve 35 is transferred into the closed position, in which the closing member 34 engages on the valve seat 33. The first seat valve 35 thus performs the function of closing the solenoid valve 10, in which function the connection between the brakemaster cylinder and the wheel brakes of the brake system is broken. During the control of drive slip, the pressure medium conveyed by a high-pressure pump via the connection 27 exerts hydraulic opening forces on the closing member 45 of the second seat valve 43. When the hydraulic pressure exceeds the opening pressure of the second seat valve 43 predetermined by the pretension of the compression spring 46, the closing member 45 lifts off from the valve seat 42 counter to the force of the compression spring. The second seat valve 43 therefore performs a pressure-limiting function on the solenoid valve 10. The pressure medium conveyed by the high-pressure pump in a pulsating manner flows through the second seat valve 43 and flows off through the flow-off bore 49 into the valve chamber 24 to the connection 26 and further to the brake master cylinder. At the same time, the stream of pressure medium conveyed in a pulsating manner undergoes throttling in the flow-off bore 49, so that pressure peaks are avoided in that part of the brake system located on the brake master cylinder side.

In the version according to FIG. 2, the throttling of the volume flow is distributed to the flow-off bore 49 and the connecting bore 50. In comparison with the embodiment according to FIG. 1, the two bores 49 and 50 can be selected larger, in order to diminish the risk of clogging by foreign bodies in the pressure medium. If the bore cross-section is appropriately coordinated in the version according to FIG. 2, the same overall throttling as in the exemplary embodiment according to FIG. 1 can be achieved.

Figure 3:
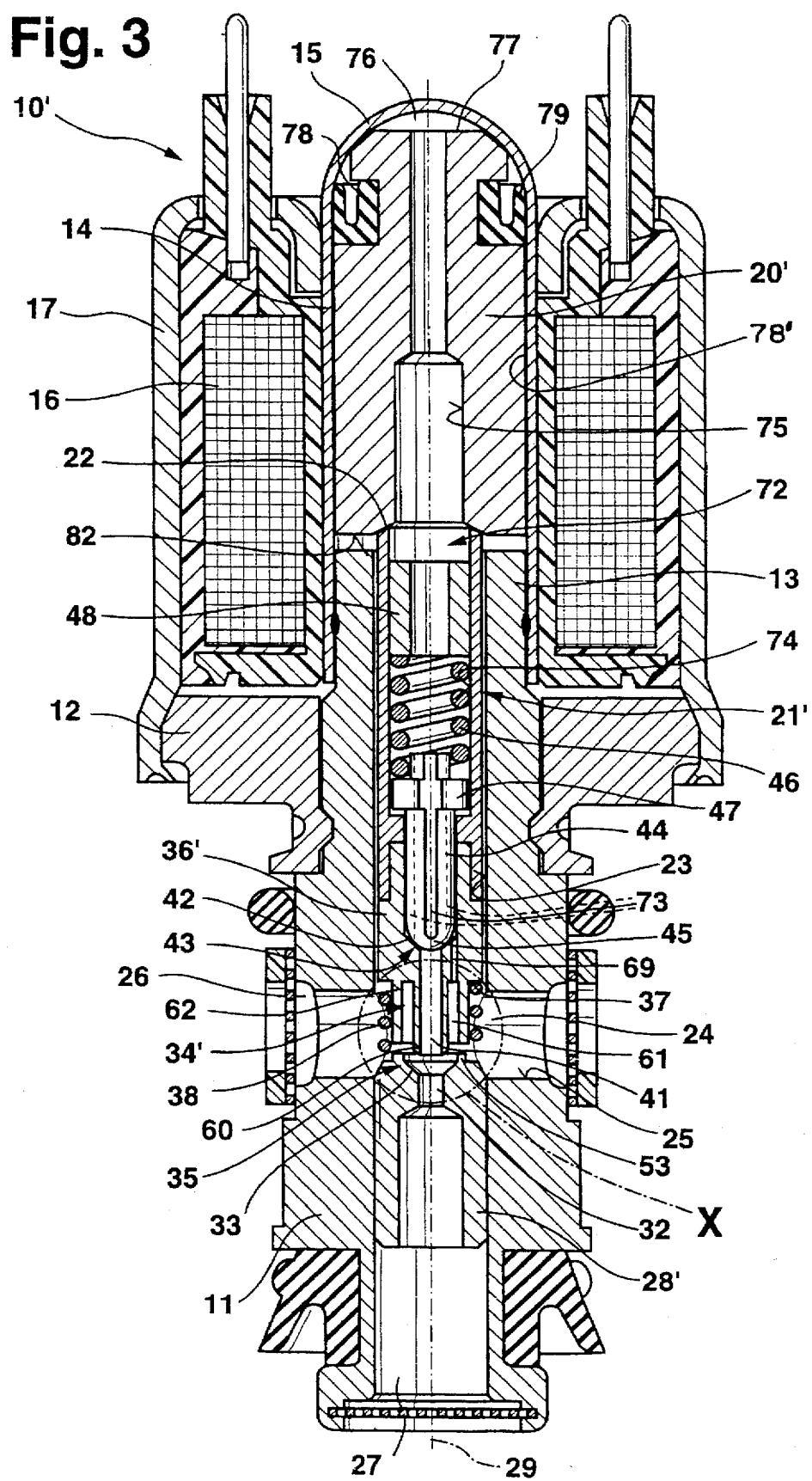
FIG. 3 shows a longitudinal section through a solenoid valve as a second exemplary embodiment, with a gap space which is assigned to the first seat valve and from which a pressure-medium duct leads to a control chamber between a magnet armature and a valve dome.

The second exemplary embodiment of the solenoid valve 10' represented in FIG. 3 differs from the first exemplary embodiment according to FIG. 1 in a differently designed valve body 28' and in a modified magnet armature 20' and valve tappet 21'.

Figure 4:
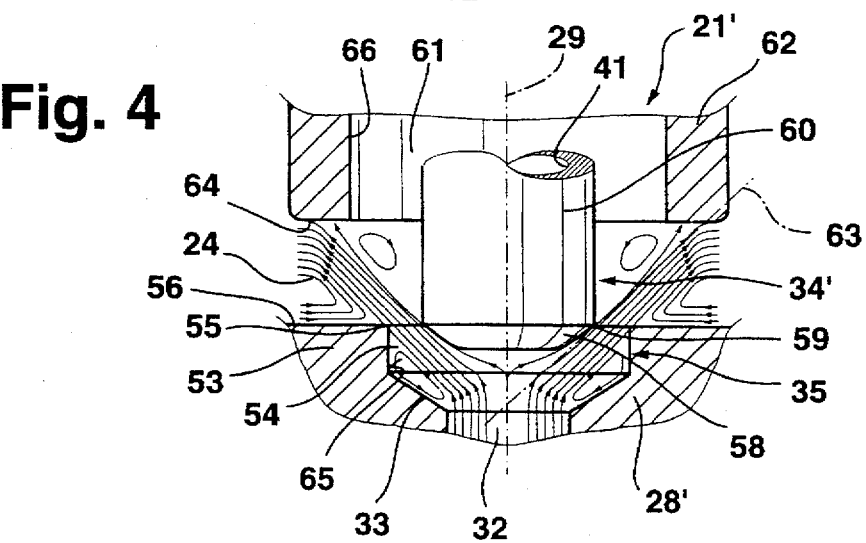
FIGS. 4 and 5 show flow paths in the seat valve region, designated in FIG. 3 by X and represented in enlarged form, of the first seat valve assuming its open position (FIG. 4) and its partly open position (FIG. 5).

The valve body 28' is provided toward the valve tappet 21' with an axially directed collar 53, so that the valve seat 33 of the first seat valve 35 is located in a straight circular depression 54 of the valve body (FIG. 4). On the tappet side, the depression 54 is limited, after a sharp edge 55, by the end face 56 of the valve body 28', said end face 56 extending at right angles to the longitudinal axis 29 of the solenoid valve 10' in the valve chamber After a spherical end zone 58 cooperating with the valve seat 33, the closing member 34' of the first seat valve 35 merges, to form an edge 59, into a straight circular-cylindrical portion 60 of the valve tappet 21', said portion 60 having the longitudinal bore 41. The straight circular-cylindrical portion 60 is surrounded by a sleeve-shaped portion 62 of the valve tappet 21' at a radial distance and with an axial setback relative to the spherical zone 58, to form a gap space 61. The axial setback of the sleeve-shaped portion 62 is dimensioned in such a way that a tangent 63 drawn in the edge region of the spherical zone 58 and intersecting the longitudinal axis 29 of the valve at an angle of preferably 45° meets the end face 64 of the sleeve-shaped portion or runs past the end face outside this portion. In the open position of the first valve 35 (FIGS. 3 and 4), the spherical zone 58 of the closing member 34' is located approximately in the region of the end face 56 of the valve body 28', so that the tangent 63 runs past the end-face edge 55 of the depression 54. In the partly open position of the first seat valve 55 shown in FIG. 5, however, the tangent 63 meets the shell wall 65 of the depression 54. A precondition of this is that the depression 54 of the valve body 28' have a diameter which is equal to or smaller than the inside diameter of the sleeve-shaped portion 62 of the valve tappet 21'. The diameter of the depression 54 is preferably located approximately centrally between the diameter of the straight circular-cylindrical portion 60 of the closing member 34' and the inside diameter of the sleeve-shaped portion 62 of the valve tappet 21'. Thus, according to the representation in FIGS. 3 to 5, the depression 54 of the valve body 28', the straight circular-cylindrical portion 60 of the closing member 34' and the inner generated surface 66 of the sleeve-shaped portion 62 of the valve tappet 21' are limited in an axis-parallel manner, whilst the end faces 56 and 64 of the valve body 28' and of the sleeve-shaped portion 62 of the valve tappet 21' lie in planes extending at right angles to the longitudinal axis 29 of the solenoid valve 10'.

Figure 5:
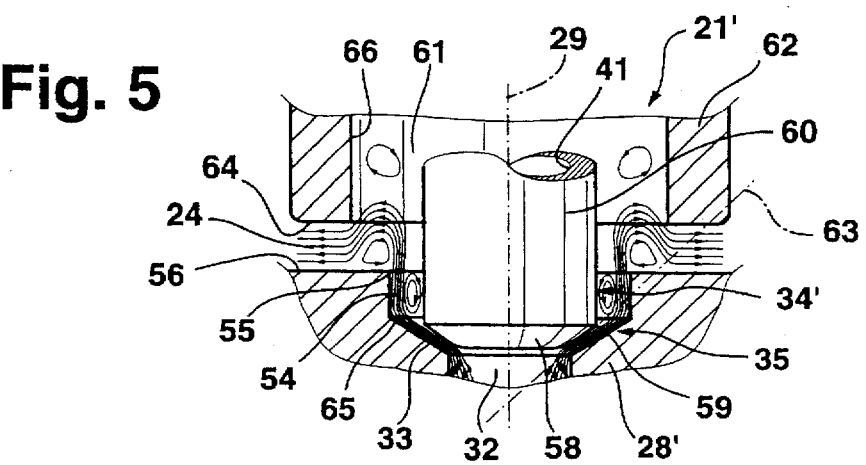

As in the first exemplary embodiment according to FIG. 1, in the exemplary embodiment according to FIGS. 3 to 5 the longitudinal bore 41 starting from the spherical zone 58 of the closing member 34' of the first seat valve 35 also leads into the valve seat 42 of the second seat valve 43. The latter is designed in the same way as in the first exemplary embodiment. In contrast to this, a connecting bore 69 starting from the valve seat 42 on the outlet side of the second seat valve 43 and extending axis-parallel to the longitudinal bore 41 leads into the gap space 61 terminating axially upstream of the valve seat 42 of the second seat valve 43. The connecting bore 69 has a relatively small diameter and therefore acts as a throttle point for pressure medium spilled via the second seat valve 43 into the gap space 61 of the valve chamber 24 and connection 26. As in the version of the first exemplary embodiment according to FIG. 2, a second throttle point can also be provided on the inflow side of the second seat valve 43.

The closing member 34' of the first seat valve 35, together with its straight circular-cylindrical portion 60 and with the longitudinal bore 41 extending therein, the sleeve-shaped portion 62, the valve seat 42 of the second seat valve 43 and the connecting bore 69 are, for manufacturing reasons, formed in the same way as the supporting surface 37 for the return spring 38 on a sleeve-shaped tappet element 36' which, in accordance with the first exemplary embodiment, is arranged so as to extend coaxially on the valve tappet 21'. There is also a relationship between the two exemplary embodiments according to FIGS. 1 and 3 in the arrangement of the closing-member carrier 44, of the compression spring 46 and of the press-in sleeve 48 in the valve tappet 21'. The magnet armature 20' and the valve tappet 21' are likewise designed as separate components which engage on one another with a sealing fit 22 under the effect of the return spring 38.

In contrast to the first exemplary embodiment, a pressure-medium duct 72 passing through the valve tappet 21' and the magnet armature 20' starts from the flow-off side of the second seat valve 43. Starting from the hemispherical closing member 45, the pressure-medium duct 72 is formed on the closing-member carrier 44 by longitudinal notches 73 making a connection conducting pressure medium into a tappet bore 74, in which the compression spring 46 and the press-in sleeve 48 are arranged. After the part formed by the tappet bore 74, the pressure-medium duct 72 merges within the sealing fit 22 into an armature bore 75 which opens into a control chamber 76 between that end face 77 of the magnet armature 20' remote from the tappet and the valve dome cap 15. The control chamber 76 is sealed off circumferentially relative to the valve dome 14. This purpose is served by a sealing cuff 78 which is arranged on the magnet armature 20' and of which the sealing lip 79 engaging on the valve dome 14 is directed toward the control chamber 76. Instead of the sealing cuff 78, the magnet armature 20' can also be sealed off relative to the valve dome 14 by means of a diaphragm seal.

The solenoid valve 10' has the following mode of operation:

During braking without slip control, there is a flow through the solenoid valve 10' in the same way as through the valve 10 of the first exemplary embodiment. Likewise, in the solenoid valve 10', the first seat valve 35 is assigned the closing function and the second seat valve 43 the pressure-limiting function.

During the reduction of brake pressure in the event of unregulated braking, the pressure medium follows the path through the first seat valve 35 into the valve chamber 24, as indicated in FIG. 4 by flow lines. The pressure medium flowing through the valve seat 33 from the valve body 32 is deflected approximately tangentially by the spherical zone 58 of the closing member 34', the flow breaking away at the sharp edge 59 of the closing member 34'. The pressure medium leaves the depression 54 in the direction of the tangent 63 and partially strikes the end face 64 of the sleeve-shaped portion 62 of the valve tappet 21'. The pressure medium experiences there a radial deflection into the valve chamber 24, out of which it flows off to the connection 26.

During braking serving for the control of drive slip, the first seat valve 35 is transferred into its closed position by passing current through the magnet coil 16. If there is an inadmissibly high pressure rise in the brake system located on the wheel-brake cylinder side, the second seat valve 43 performs its pressure-limiting function and, with the throttling effect, spills pressure medium through the connecting bore 69 and the gap space 61 into the valve chamber 24 to that connection 26 of the solenoid valve 10' located on the brake master cylinder side. At the same time, the sealing fit 22 and the sealing off of the control chamber 76 prevent the pressure medium from following a different path.

When the control of drive slip has ended, the solenoid valve 10' is switched to a currentless state. Under the effect of hydraulic opening forces and the force of the return spring 38 on the valve tappet 21', the magnet armature 20' together with the valve tappet is moved in the direction of the cap 15 of the valve dome 14. When the first seat valve 35 opens, pressure medium flows through the valve seat 33 according to the representation shown in FIG. 5, that is to say, during the penetration of the narrow gap between the valve seat 33 and the spherical zone 58, the flow lines follow a path according to the tangent 63 and, when leaving the valve seat, strike the shell wall 65 of the depression 54. The flow lines experience axial deflection here, so that, when leaving the depression 54, they penetrate partially to the gap space 61 between the closing member 34' and the sleeve-shaped portion 62 and generate a dynamic pressure there. As a result of the dynamic pressure, the pressure-medium flow is guided out of the gap space 61: the pressure medium then follows a radial path between the two end faces 56 and 64 of the valve body 28' and sleeve-shaped portion 62 in the direction of the connection 26.

The dynamic pressure generated in the gap space 61 in the partly open position of the first seat valve 35 is transmitted through the connecting bore 69 and the pressure-medium duct 72 into the control chamber 76. A pressure imbalance is thereby generated on the magnet armature 20', since its end face 77 remote from the tappet is exposed to a higher pressure than its tappet-side end face 82 which is connected to the valve chamber 24 by means of the longitudinal bore 23. The hydraulic force generated in the control chamber 76 acts on the magnet armature 20' counter to its direction of movement and partially compensates the opening forces acting on the valve tappet 21'. This results in a slowed opening movement of the solenoid valve 10', at least as long as the first seat valve 35 is in the partly open position. Since, in this partly open position, the pressure medium can flow through the first seat valve 35 in a throttled manner only, the occurrence of a pressure surge on the flow-off side is largely avoided. With an increasing valve stroke, the effect of the dynamic pressure is reduced, so that the first seat valve 35 can assume its open position, in which the throughflow of the pressure medium takes place in a largely unthrottled manner according to the representation in FIG. 4.

The foregoing relates to preferred exemplary embodiments of the invention, it being understood that other variants and embodiments thereof are possible within the spirit and scope of the invention, the latter being defined by the appended claims.

We claim:

1. A solenoid valve (10) with pressure limitation for controlled-slip hydraulic motor vehicle brake systems, comprising a valve seat (33) surrounding a valve orifice (32) and with a closing member (34) of a first seat valve (35), said closing member cooperating with said valve seat (33) and assuming an open position under an effect of a return spring (38), a valve tappet (21), by means of said valve tappet (21) the first seat valve (35) is transferred into a closed position as a result of an effect of a magnetic force, and a closing-member carrier (44) which is received in the valve tappet so as to be longitudinally movable in the valve tappet (21) and which is under the effect of a pretensioned compression spring (46) arranged in the valve tappet, the closing member (34) of the first seat valve (35) is fixedly connected to the valve tappet (21), starting with the closing member (34) of the first seat valve (35), a longitudinal bore (41) passes through the valve tappet (21), said longitudinal bore (41) is in axial alignment with the valve orifice (32) of the first seat valve and said longitudinal bore opens into a valve seat (42) of a second seat valve (43), the closing-member carrier (44) in the valve tappet (21) includes a closing member (45) of the second seat valve (43), said closing member (45) of the second seat valve (43) assumes a closed position under an effect of the pretensioned compression spring (46) and for pressure limitation is transferred into an open position by means of hydraulic forces, if the first seat valve (35) assumes a closing position and a throttle point (49, 50) is provided on the inflow side and/or on the flow-off side of the second seat valve (43).

2. The solenoid valve as claimed in claim 1, wherein there is arranged on the valve tappet (21) a coaxially extending sleeve-shaped tappet element (36), on which the closing member (34) of the first seat valve (35), the longitudinal bore (41), the valve seat (42) of the second seat valve (43), a radially extending flow-off bore (49) and a supporting surface (37) for the return spring (38) are formed.

3. The solenoid valve as claimed in claim 1, in which:

the valve seat (33) of the first seat valve (35) is located in at least an approximately straight circular depression (54) of a valve body (28'), said depression (54) being limited on a tappet side by an at least approximately radially extending end face (56) of the valve body, after a spherical end zone (58), the closing member (34') of the first seat valve (35) merges, to form an edge (59), into a straight circular-cylindrical portion (60) of the valve tappet (21'), said portion (60) having the longitudinal bore (41), the straight circular-cylindrical portion (60) is surrounded by a sleeve-shaped portion (62) of the valve tappet (21') at a radial distance and with an axial setback relative to the spherical end zone (58), to form a gap space (61), the axial setback of the sleeve-shaped portion (62) is dimensioned in such a way that a tangent (63) drawn in an edge region of the spherical zone (58) and intersecting the longitudinal axis (29) of the solenoid valve (10') meets an end face (64) of the sleeve-shaped portion (62) or runs past the end face outside the sleeve shaped portion, in the open position of the first seat valve (35), the spherical zone (58) of the closing member (34') of the first seat valve (35) is located at least approximately in a region of the valve body end face (56), so that the tangent (63) runs past an end-face edge (55) of the depression (54) of the valve body (28'), in the partly open position of the first seat valve (35), the tangent (63) meets a shell wall (65) of the depression (54), a connecting bore (69) designed as a throttle point leads from the gap space (61) to a flow-off side of the second seat valve (43), a pressure-medium duct (72) starts from the flow-off side of the second seat valve (43) and passes through the valve tappet (21') and a magnet armature (20') coupled to the valve tappet (21'), the magnet armature (20') is received so as to be longitudinally movable in a valve dome (14) surrounded by a magnet coil (16), and a circumferentially sealed-off control chamber (76), into which the pressure-medium duct (72) opens, is located between an end face (77) of the magnet armature (20') remote from the tappet and the valve dome (24).

4. The solenoid valve as claimed in claim 3, wherein the tangent (63) forms an angle of between 30° and 60°, preferably 45°, with the longitudinal axis (29) of the solenoid valve.

5. The solenoid valve as claimed in claim 3, wherein the depression (54) of the valve body (28') has a diameter which is equal to or smaller than the inside diameter of the sleeve-shaped portion (62) of the valve tappet (21').

6. The solenoid valve as claimed in claim 5, wherein the diameter of the depression (54) is located at least approximately centrally between a diameter of the straight circular-cylindrical portion (60) of the closing member (34') of the first seat valve (35) and the inside diameter of the sleeve-shaped portion (62) of the valve tappet (21').

7. The solenoid valve as claimed in claim 3, wherein the depression (54) of the valve body (28'), the straight circular-cylindrical portion (60) of the closing member (34') of the first seat valve and the inner generated surface (66) of the sleeve-shaped portion (62) of the valve tappet (21') are limited in an axis-parallel manner, whilst the end faces (56, 64) of the valve body (28') and of the sleeve-shaped portion (62) of the valve tappet (21') lie in planes extending at right angles to the longitudinal axis (29) of the solenoid valve.

8. The solenoid valve as claimed in claim 3, wherein there is arranged on the valve tappet (21') a coaxially extending sleeve-shaped tappet element (36'), on which the closing member (34') of the first seat valve (35) together with its straight circular-cylindrical portion (60), the valve seat (42) of the second seat valve (43), the connecting bore (69) and a supporting surface (37) for the return spring (38) are formed.

9. The solenoid valve as claimed in claim 3, wherein the magnet armature (20') and the valve tappet (21') are designed as separate components which engage on one another under an effect of the return spring (38) with a sealing fit (22) surrounding the pressure-medium duct (72).

10. The valve as claimed in claim 3, wherein the magnet armature (20') has a sealing cuff (78), of which a sealing lip (79) engaging on the valve dome (14) is directed toward the control chamber (76).

11. The valve as claimed in claim 3, wherein the magnet armature (20') is sealed off relative to the valve dome (14) by means of a diaphragm seal.

* * * * *